(12) United States Patent
Takatsu et al.

(10) Patent No.: US 12,496,663 B2
(45) Date of Patent: Dec. 16, 2025

(54) WORKPIECE SUPPORT MEMBER FOR THERMAL PROCESSING MACHINE

(71) Applicant: AMADA CO., LTD., Kanagawa (JP)

(72) Inventors: Masato Takatsu, Kanagawa (JP); Jun Setoguchi, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 716 days.

(21) Appl. No.: 17/919,893

(22) PCT Filed: Apr. 20, 2021

(86) PCT No.: PCT/JP2021/015945
§ 371 (c)(1),
(2) Date: Oct. 19, 2022

(87) PCT Pub. No.: WO2021/215416
PCT Pub. Date: Oct. 28, 2021

(65) Prior Publication Data
US 2023/0145893 A1    May 11, 2023

(30) Foreign Application Priority Data
Apr. 24, 2020   (JP) .................................. 2020-077114

(51) Int. Cl.
*B23Q 3/02* (2006.01)
*B23K 26/10* (2006.01)
*B23K 37/04* (2006.01)

(52) U.S. Cl.
CPC .............. *B23K 37/04* (2013.01); *B23K 26/10* (2013.01); *B23K 37/0408* (2013.01); *B23Q 3/02* (2013.01)

(58) Field of Classification Search
None
See application file for complete search history.

(56) References Cited

FOREIGN PATENT DOCUMENTS

| CN | 201103195 Y | | 8/2008 |
|----|-------------|---|--------|
| JP | 3069655 U | | 3/2000 |
| JP | 2001170790 A | * | 6/2001 |
| JP | 2001246490 A | * | 9/2001 |
| JP | 2001-314998 A | | 11/2001 |

(Continued)

OTHER PUBLICATIONS

International Search Report for corresponding Application No. PCT/JP2021/015945, mailed Jul. 6, 2021.

(Continued)

*Primary Examiner* — John J Norton
(74) *Attorney, Agent, or Firm* — Renner, Otto, Boisselle & Sklar, LLP

(57) ABSTRACT

A workpiece support member for a thermal processing machine is installed on a workpiece support table to support a workpiece to be thermally processed, and includes a base member and a supporting member. The base member is formed of a plate-like member in a horizontally long shape, and provided with a plurality of protruding supporting member attachment parts at predetermined distance intervals on an upper part thereof. The supporting member is formed of a plate-like member in a horizontally long shape, and is installed in an attachable and removable state with a lower side thereof fitted alternately to a front surface and a rear surface of each of the adjacent supporting member attachment parts of the base member.

4 Claims, 6 Drawing Sheets

(56) References Cited

FOREIGN PATENT DOCUMENTS

| JP | 2013244535 | A | | 12/2013 | |
|---|---|---|---|---|---|
| KR | 200388091 | Y1 | * | 6/2005 | ............. B23K 37/04 |
| KR | 100510958 | B1 | * | 8/2005 | ............. B23K 37/04 |
| KR | 20100013827 | A | * | 2/2010 | ............... B25H 1/20 |
| KR | 101269598 | B1 | * | 6/2013 | ............... B23Q 3/06 |
| KR | 101418538 | B1 | * | 7/2014 | ........... B23K 26/702 |
| KR | 20170111839 | A | * | 10/2017 | ......... B23K 37/0461 |
| KR | 101987109 | B1 | * | 9/2019 | ............. B65G 47/92 |
| NL | 2008731 | C2 | * | 10/2013 | ......... B23K 37/0408 |

OTHER PUBLICATIONS

Written Opinion for corresponding Application No. PCT/JP2021/015945, mailed Jul. 6, 2021.
Extended European Search Report for corresponding EP Application No. 21793209.4 issued Aug. 21, 2023.

* cited by examiner

WORKPIECE SUPPORT MEMBER FOR THERMAL PROCESSING MACHINE

TECHNICAL FIELD

The present invention relates to a workpiece support member for a thermal processing machine.

BACKGROUND ART

Conventionally, to a workpiece support table of a thermal processing machine such as a laser processing machine or a plasma processing machine, a plurality of plate-like workpiece support members are provided as supporting members for supporting a bottom surface of a sheet metal (workpiece) to be processed. The plurality of workpiece support members are arranged in a side-by-side manner at predetermined intervals on the workpiece support table with each plate surface thereof being perpendicular to a floor surface.

When the workpiece to be processed is placed on the workpiece support table on which the plurality of such workpiece support members are arranged, the upper end portion of each workpiece support member comes into contact with the bottom surface of the workpiece so that the workpiece is supported.

CITATION LIST

Patent Literature

Patent Literature 1: Japanese Patent Application Laid-Open Publication No. 2001-314998

SUMMARY

It is necessary to replace the above-described workpiece support members as appropriate because damage, which is caused by thermal processing to the supported workpiece, is unavoidable. At this time, if the workpiece support members are each composed of a single member, it is necessary to replace the entire member each time a workpiece support member is replaced, which causes problems that production cost is required and labor for replacement work is required.

One aspect of the present invention provides a workpiece support member for a thermal processing machine in which a portion that supports a workpiece to be thermally processed can be replaced efficiently and easily.

One aspect of the present invention is a workpiece support member for a thermal processing machine that is installed on a workpiece support table to support a workpiece to be thermally processed, and includes a base member formed of a plate-like member in a horizontally long shape and provided with a plurality of protruding supporting member attachment parts at predetermined distance intervals on an upper part thereof and a supporting member formed of a plate-like member of a carbon fiber in a horizontally long shape and installed in an attachable and removable state with a lower side thereof fitted alternately to a front surface and a rear surface of each of the adjacent supporting member attachment parts of the base member.

According to one aspect of the present invention, it is possible to provide a workpiece support member for a thermal processing machine in which a portion that supports a workpiece to be thermally processed can be replaced efficiently and easily.

DESCRIPTION OF EMBODIMENT

Hereinafter, a laser processing machine, which is a thermal processing machine, that uses a workpiece support table on which a workpiece support member according to one embodiment is installed will be described with reference to the attached drawings.

Figure 1:
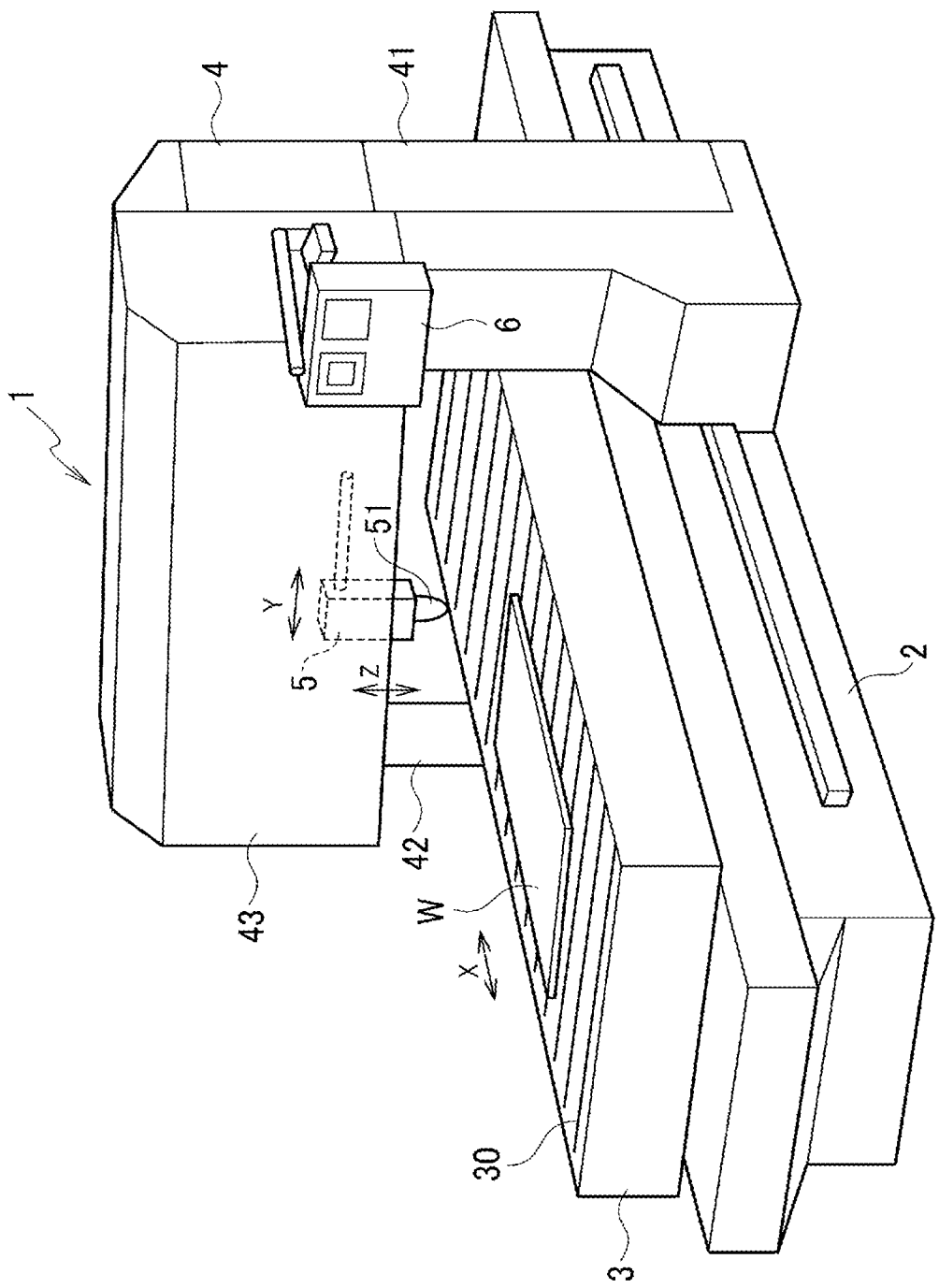
FIG. 1 is an external perspective view showing a laser processing machine that uses a workpiece support member for a thermal processing machine according to one embodiment.

FIG. 1 is an external perspective view showing a laser processing machine 1 that uses a workpiece support member 30 of a thermal processing machine according to one embodiment. The laser processing machine 1 according to the present embodiment performs cutting processing, and as shown in FIG. 1, a workpiece support table 3 for installing a workpiece W to be thermally processed is provided on a device base 2. On the workpiece support table 3, a plurality of workpiece support members 30 that support the workpiece W to be processed are arranged in the X direction. The material and shape of the respective workpiece support members 30 will be described later.

The laser processing machine 1 includes a gate-type frame 4 arranged in such a manner as to straddle the workpiece support table 3. The frame 4 includes side frames 41 and 42 and an upper frame 43.

A carriage 5 that is movable in the Y direction is provided in the upper frame 43. A laser head 51 that emits a laser is attached to the carriage 5. The laser head 51 is configured to move arbitrarily in the X and Y directions above the workpiece W when the frame 4 is moved in the X direction by a dedicated drive system (not shown) and the carriage 5 is moved in the Y direction by a dedicated drive system (not shown).

An NC device (numerical control device) 6 for controlling the laser processing machine 1 is attached to the frame 4. The NC device 6 controls the laser processing machine 1 according to processing data (NC data: numerical controlling data) for processing the workpiece W. The NC device 6 is a control device that controls the laser processing machine 1.

The workpiece W is cut when the laser head 51 irradiates the workpiece W with the laser while moving in the X direction or the Y direction by the frame 4 and the carriage 5, under the control of the NC device 6.

The workpiece support member 30 that is installed on the workpiece support table 3 will be described. Since damage caused by thermal processing to the supported workpiece W is unavoidable, it is necessary to replace the workpiece support member 30 as appropriate. At this time, production cost can be suppressed by configuring the workpiece support member 30 such that only a member of the damaged portion can be partially replaced.

As first and second configuration examples of the workpiece support member 30 in which a member can be partially replaced, a workpiece support member 30A shown in FIG. 2 and a workpiece support member 30B shown in FIG. 3 will be described.

Figure 2:
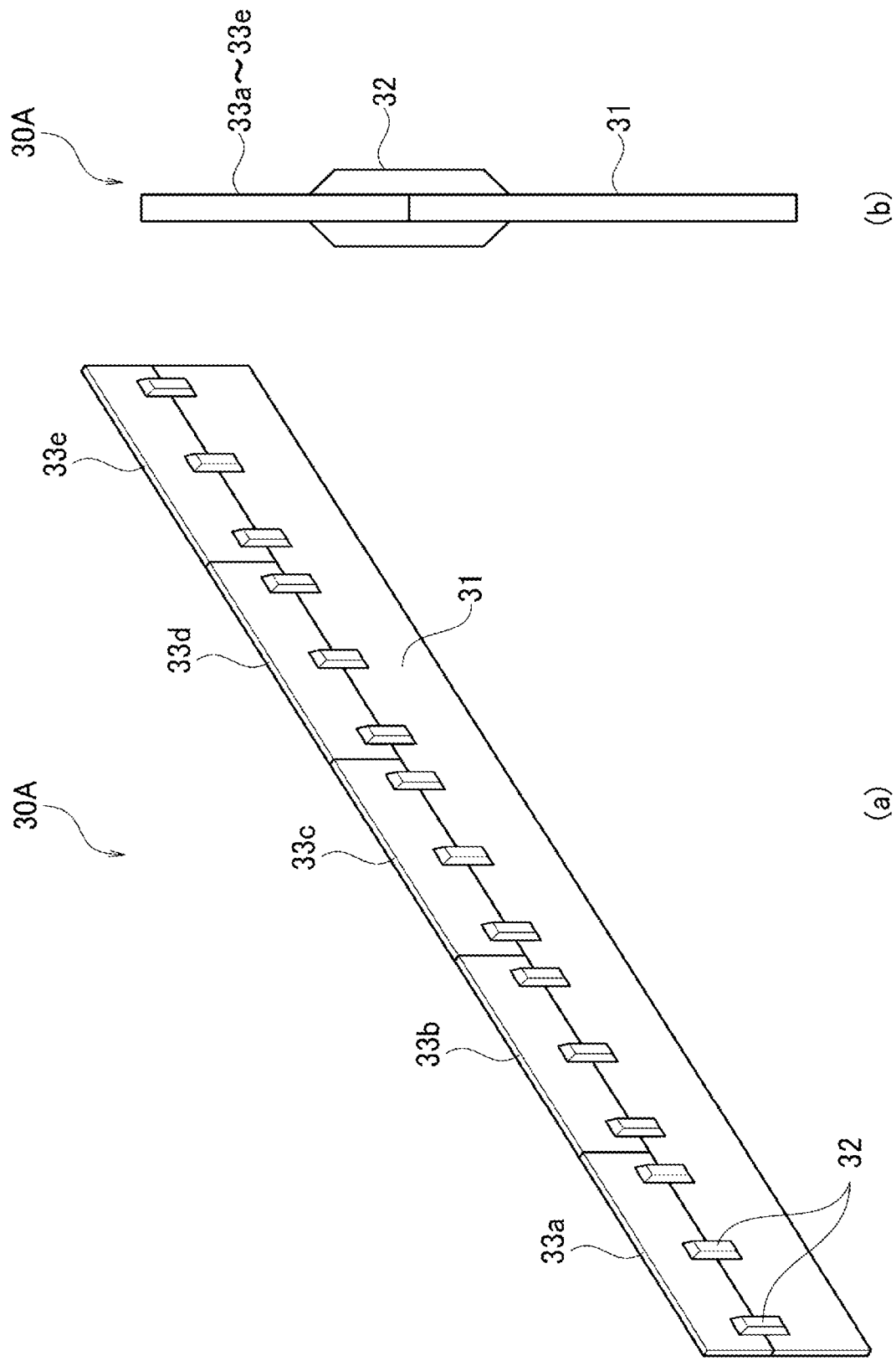
FIG. 2(a) is an external perspective view and FIG. 2(b) is a side view of a workpiece support member 30A, which is a first configuration example of the workpiece support member in one embodiment.
Figure 3:
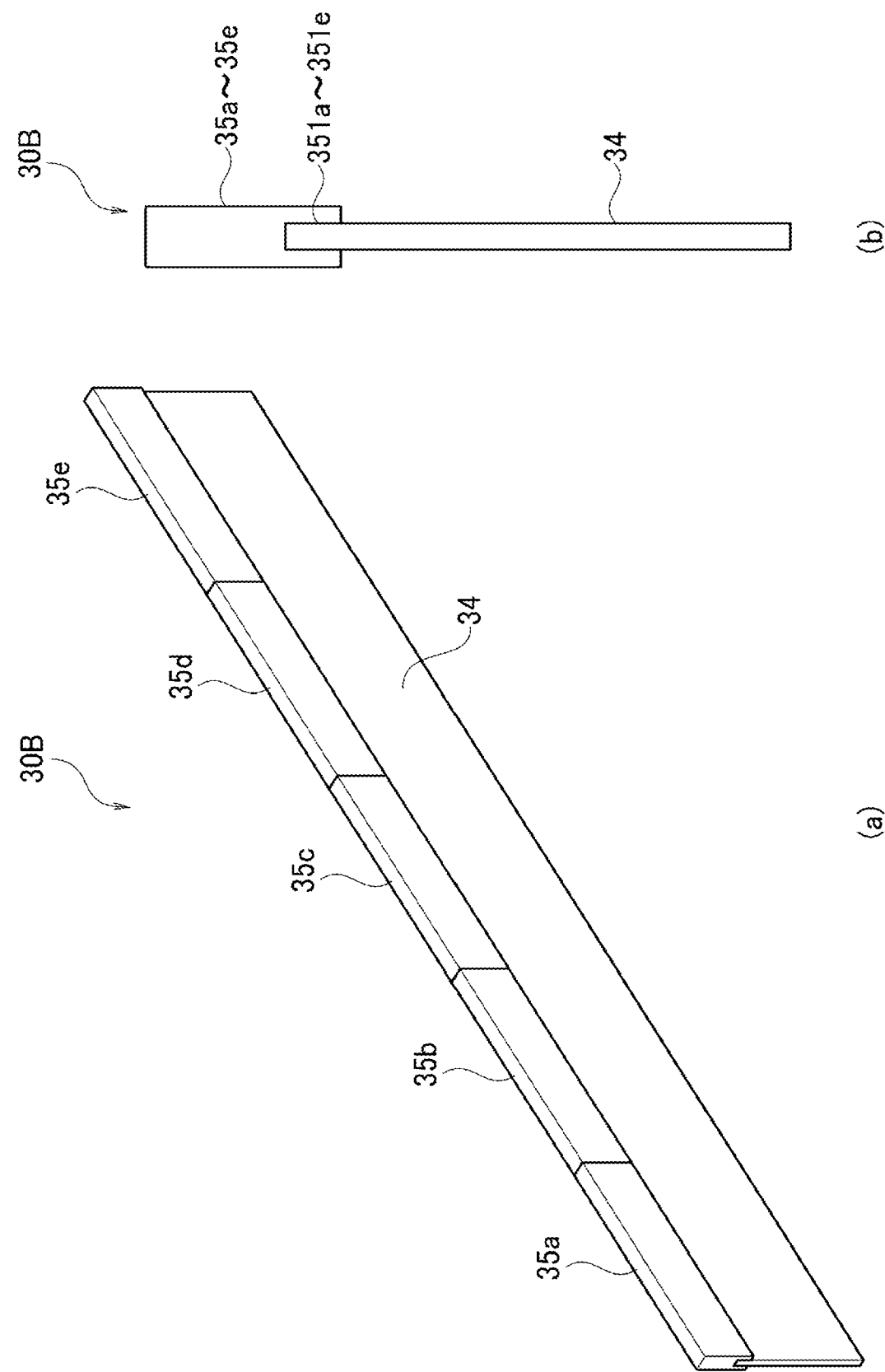
FIG. 3(a) is an external perspective view and FIG. 3(b) is a side view of a workpiece support member 30B, which is a second configuration example of the workpiece support member in one embodiment.

FIG. 2 shows the workpiece support member 30A that is the first configuration example of the workpiece support member 30 in one embodiment. FIG. 2(*a*) is an external perspective view of the workpiece support member 30A, and FIG. 2(*b*) is a side view of the workpiece support member 30A. The workpiece support member 30A is formed of a base member 31 composed of a plate-like member made of a metal in a horizontally long shape, and a plate-like member of a carbon fiber. The workpiece support member 30A includes a plurality of supporting members 33*a*, 33*b*, 33*c*, 33*d*, and 33*e* connected to the upper portion of the base member 31 by connecting members 32. The carbon fiber constituting the base member 31 will be described later. FIG. 2(*a*) shows a case in which the number of supporting members connected to the base member 31 is five, but the number is not limited to this. The number of supporting members may be two or more, and may be one if partial replacement is not performed.

Each of the supporting members 33*a* to 33*e* is composed of a long plate-like member including a long side shorter than that of the base member 31, and as shown in FIG. 2(*a*), is installed continuously along the upper side of the base member 31 in the lateral direction. FIG. 2(*a*) shows a case in which each of the supporting members 33*a* to 33*e* is connected to the base member 31 by three connecting members 32, but the number of the connecting members 32 is not limited to this.

When the workpiece W to be processed is placed on the workpiece support table 3 on which a plurality of the workpiece support members 30A described above are arranged, the upper ends of the supporting members 33*a* to 33*e* of each workpiece support member 30A come into contact with the bottom surface of the workpiece W so that the workpiece W is supported. Then, the laser processing machine 1 executes the thermal processing to the supported workpiece W.

When the thermal processing is executed on the workpiece support table 3, any of the supporting members 33*a* to 33*e* of any of the workpiece support members 30A may be damaged. In this case, an operator detaches only a damaged supporting member of the corresponding workpiece support member 30A from the connecting member 32 and attaches a new supporting member for replacement. As a result, the workpiece support table 3 can be maintained in an appropriate state.

Next, a workpiece support member 30B will be described. FIG. 3 shows the workpiece support member 30B that is the second configuration example of the workpiece support member 30 in one embodiment. FIG. 3(*a*) is an external perspective view of the workpiece support member B, and FIG. 3(*b*) is a side view of the workpiece support member B. The workpiece support member 30B includes a base member 34 composed of a plate-like member made of a metal in a horizontally long shape and a plurality of supporting members 35*a*, 35*b*, 35*c*, 35*d*, and 35*e* composed of a plate-like member of a carbon fiber and installed at the upper portion of the base member 34.

Each of the supporting members 35*a* to 35*e* is composed of a long plate-like member including a long side shorter than that of the base member 34, and groove portions 351*a* to 351*e* into which the base member 34 can be fitted are respectively formed on the long side at the bottom part. These supporting members 35*a* to 35*e* are installed continuously in the lateral direction as shown in FIG. 3(*a*) by fitting the upper side of the base member 34 into the respective groove portions 351*a* to 351*e*.

When the workpiece W to be processed is placed on the workpiece support table 3 on which a plurality of the workpiece support members 30B described above are arranged, the upper ends of the supporting members 35*a* to 35*e* of each workpiece support member 30B come into contact with the bottom surface of the workpiece W so that the workpiece W is supported. Then, the laser processing machine executes the thermal processing to the workpiece W.

When any of the supporting members 35*a* to 35*e* of any of the workpiece support member 30B is damaged, the operator detaches only a damaged supporting member of the corresponding workpiece support member 30B from the base member 34 and attaches a new supporting member for replacement. As a result, the workpiece support table 3 can be maintained in an appropriate state.

By using the workpiece support member 30A or the workpiece support member 30B as described above for the workpiece support table 3, it is possible to replace only the damaged supporting member and to regenerate the workpiece support member efficiently.

However, if the workpiece support member 30A is repeatedly used, the connecting members 32 and the supporting members 33*a* to 33*e* may come into contact with each other and wear or deformation is caused in any of the members, resulting in rattling of a connecting mechanism thereof. In the similar manner, if the workpiece support member 30B is repeatedly used, rattling may be caused in a connecting mechanism between the groove portions 351*a* to 351*e* and the base member 34.

Further, since the workpiece support member 30A uses the connecting members 32, the number of constituent members is large, which results in high production cost and high cost required for an attachment work. In addition, the workpiece support member 30B requires labor and production cost for processing the groove portions 351*a* to 351*e* when the supporting members 35*a* to 35*e* are produced.

Figure 4:
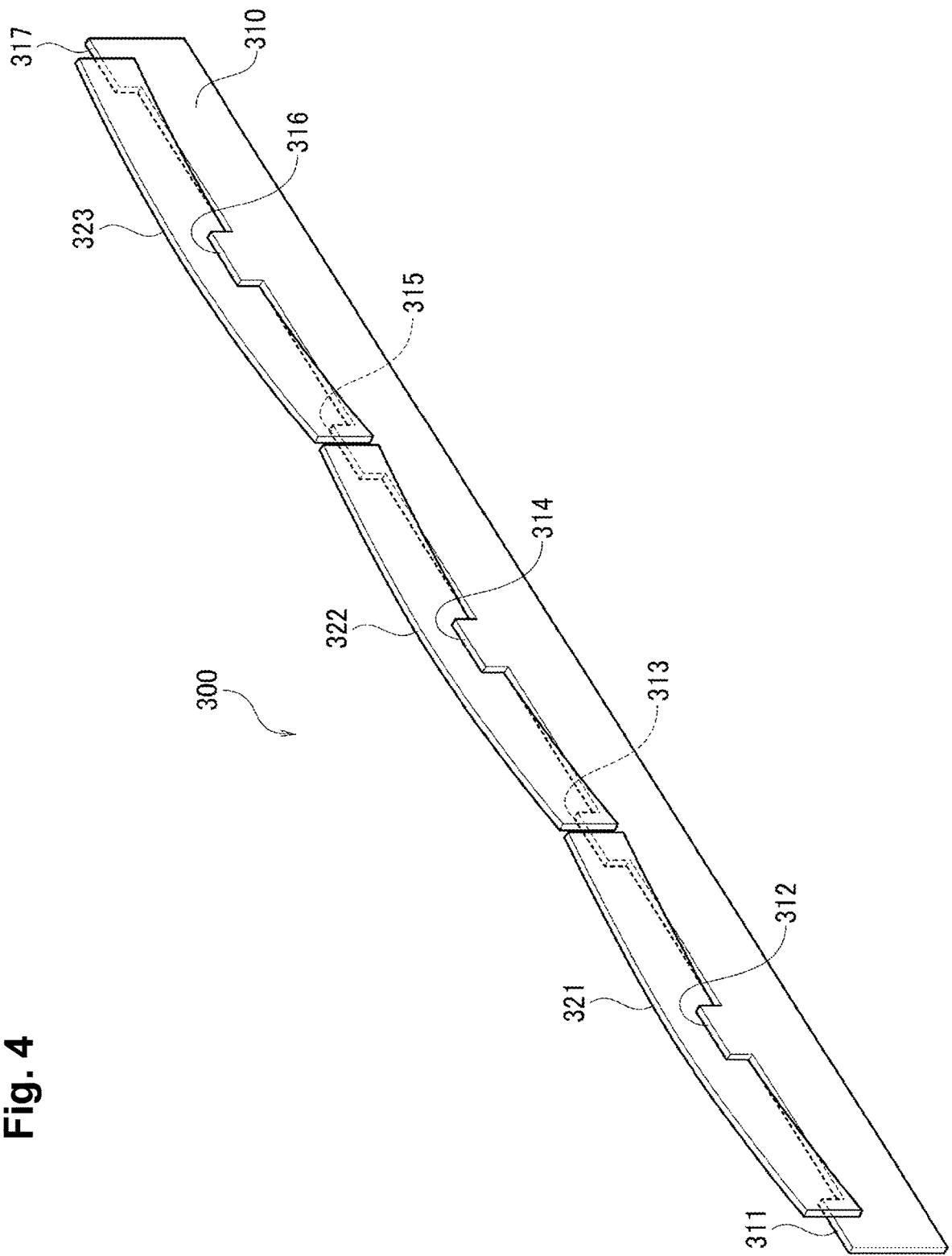
FIG. 4 is an external perspective view of a workpiece support member 300 that is a third configuration example of the workpiece support member in one embodiment.

A workpiece support member 300, which is a third configuration example configured to solve these problems, will be described. FIG. 4 is an external perspective view of the workpiece support member 300 that is the third configuration example of the workpiece support member in one embodiment. The workpiece support member 300, which is the third configuration example, is installed on the workpiece support table 3 to support the workpiece W to be thermally processed, and includes a base member 310 formed of a plate-like member in a horizontally long shape and provided with a plurality of protruding supporting member attachment parts 311 to 317 at predetermined distance intervals on an upper portion thereof, and supporting members 321 to 323 formed of a plate-like member in a horizontally long shape and installed in an attachable and removable state with a lower side thereof fitted alternately to a front surface and a rear surface of each of the adjacent supporting member attachment parts 311 to 317 of the base member 310. The supporting members 321 to 323 are formed of a carbon fiber. The supporting members 321 to 323 are each formed in a horizontally long shape including a long side shorter than that of the base member 310, and are installed in multiple numbers on the base member 310.

Hereinafter, the workpiece support member 300, which is the third configuration example, will be described in detail. As shown in FIG. 4, the workpiece support member 300 includes the base member 310 formed of a plate-like member made of a metal in a horizontally long shape, and the plurality of supporting members 321, 322, and 323 each formed of a plate-like member of a carbon fiber in a horizontally long shape including a long side shorter than that of the base member 310 and set up in a side-by-side manner on an upper part of the base member 310.

The base member 310 is provided with the plurality of protruding supporting member attachment parts 311 to 317 at predetermined distance intervals narrower than those of the long sides of the supporting members 321 to 323.

Specifically, the supporting member attachment part 311 is provided at one end of the upper portion of the base member 310, and the supporting member attachment part 312 is provided at a position of the ⅙ length of the base member 310 from the end portion. Further, the supporting member attachment part 313 is provided at a position of the ⅓ length of the base member 310 from the end portion. The supporting member attachment part 314 is provided at a position of the ½ length of the base member 310 from the end portion. The supporting member attachment part 315 is provided at a position of the ⅔ length of the base member 310 from the end portion. The supporting member attachment part 316 is provided at a position of the ⅚ length of the base member 310 from the end portion. Further, the supporting member attachment part 317 is provided at the other end.

The supporting members 321 to 323 are each formed by cutting out a thin plate, which is obtained by plain weave of a string-shaped carbon fiber, for example, a C/C composite (carbon fiber reinforced carbon composite) material, into a long shape. Plain weave is a method of weaving in which fibers are crossed vertically and horizontally one by one. Note that the method of weaving the carbon fiber may be satin weave, twill weave, crepe weave, or irregular weave, as long as the fiber is woven in any structure. Since the C/C composite material is reinforced by impregnating the woven carbon fiber with various substances, elasticity is generated when the C/C composite material is formed in a thin plate shape.

The supporting members 321 to 323 are each formed in a horizontally long shape including a long side of about ⅓ of the long side of the base member 310. Then, by utilizing the elasticity of the carbon fiber, each lower side is fitted so as to be alternately caught in the front surface and the rear surface of the plurality of adjacent supporting member attachment parts of the base member 310.

Specifically, by the operator for the attachment work, the left end of the lower side of the supporting member 321 is caught in the front surface of the supporting member attachment part 311 of the base member 310, the vicinity of the center thereof is caught in the rear surface of the supporting member attachment part 312 thereof, and the right end thereof is caught in the front surface of the supporting member attachment part 313 thereof, so that the supporting member 321 is fitted into the base member 310. Further, the left end of the lower side of the supporting member 322 is caught in the front surface of the supporting member attachment part 313, the vicinity of the center thereof is caught in the rear surface of the supporting member attachment part 314 thereof, and the right end thereof is caught in the front surface of the supporting member attachment part 315 thereof, so that the supporting member 322 is fitted into the base member 310. Further, the left end of the lower side of the supporting member 323 is caught in the front surface of the supporting member attachment part 315 thereof, the vicinity of the center thereof is caught in the rear surface of the supporting member attachment part 316 thereof, and the right end thereof is caught in the front surface of the supporting member attachment part 317 thereof, so that the supporting member 323 is fitted into the base member 310.

When the supporting members 321 to 323 are fitted into the base member 310 in this manner, the supporting members 321 to 323 hold the supporting member attachment parts 311 to 317 of the base member 310 by the elastic force, thereby allowing the supporting member attachment parts 311 to 317 to be attached in a stable state without rattling. Note that the supporting members 321 to 323 can be held as long as the supporting member attachment parts 311 to 317 are made of a material having an elastic property. Therefore, even if the supporting members 321 to 323 are formed of a conventional iron-based material or aluminum-based material, or copper-based material that is expensive, it is possible to attach the supporting member attachment parts 311 to 317 in a stable state. In the above-described embodiment, the string-shaped carbon fiber is used for the supporting members 321 to 323 because the string-shaped carbon fiber enables the supporting members 321 to 323 to be less likely weld to the workpiece W when the workpiece W is laser-cut and enables a dross generated when the workpiece W is cut to less likely adhere to the workpiece W, and the string-shaped carbon fiber is an elastic body.

A plurality of the workpiece support members 300 described above are arranged on the workpiece support table 3, and while the workpiece W to be processed is placed on the workpiece support table 3, the thermal processing is performed to the workpiece W. When any of the supporting members is damaged by the thermal processing, the operator pulls the corresponding supporting member of the corresponding workpiece support member 300 upward and removes the supporting member from the base member 310. Then, a new supporting member is caught in the supporting member attachment part at the corresponding location to be attached. In this manner, each of the supporting members 321 to 323 is configured to be easily attached to and removed from the base member 310.

By using the workpiece support member 300 described above for the workpiece support table 3, it is possible to replace only the damaged supporting member and efficiently regenerate the workpiece support member in a stable structure. Since the supporting member to be produced as a replacement member has a simple structure, the supporting member can be easily produced by blanking, which can suppress the production cost.

In the workpiece support member 300 according to the third configuration example described above, by forming the supporting members 321 to 323 with the carbon fiber, it is possible to prevent metal, which is molten from the workpiece W during the thermal processing, from adhering. However, when the workpiece W is thick, the amount of the metal melted from the workpiece W during the processing is large. Therefore, there is a possibility that the dross adheres to a bottom surface of the workpiece W and sandwiches the workpiece support member 300 from above, resulting in the molten metal adhering to the supporting members 321 to 323.

If the molten metal is adhered in this manner, the workpiece W and the supporting members 321 to 323 are in a state of being connected by the molten metal, and when the processed workpiece W is lifted by a forklift or the like, the corresponding supporting members 321 to 323 are also pulled upward. When the supporting members 321 to 323 are pulled upward, the supporting members 321 to 323 come off from the base member 310, which causes inconvenience.

Figure 5:
FIG. 5 is an external perspective view of a workpiece support member 400 that is a fourth configuration example of the workpiece support member in one embodiment.

A workpiece support member 400, which is a fourth configuration example configured to avoid this inconvenience, will be described. FIG. 5 is an external perspective view of the workpiece support member 400 that is the fourth configuration example of the workpiece support member in one embodiment.

Figure 6:
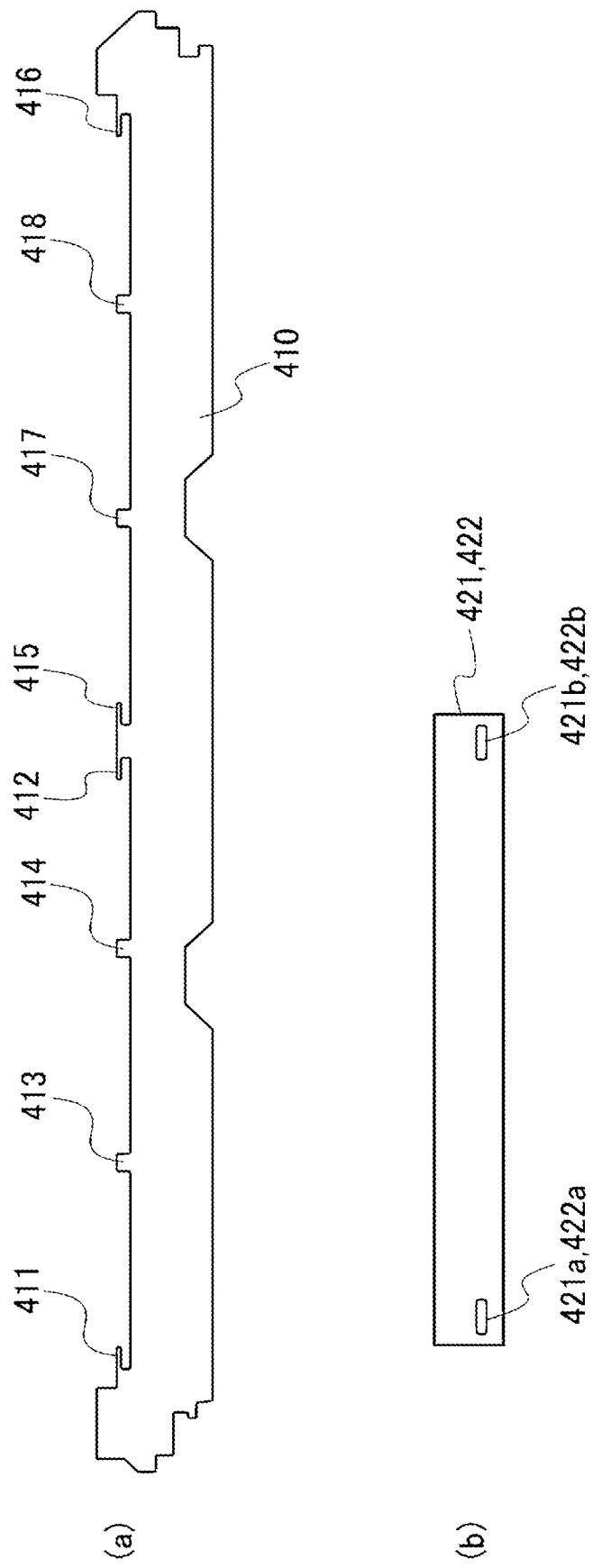
FIG. 6(a) is a front view of a base member 410 and FIG. 6(b) is a front view of supporting members 421 and 422 of the workpiece support member 400, which is the fourth configuration example of the workpiece support member in one embodiment.

The workpiece support member 400 includes a base member 410 formed of a plate-like member made of a metal in a horizontally long shape, and a plurality of supporting members 421 and 422 each formed of a plate-like member of a carbon fiber in a horizontally long shape including a long side shorter than that of the base member 410 and set up in a side-by-side manner at an upper portion of the base member 410. FIGS. 6(*a*) and (*b*) show the workpiece support member 400 that is the fourth configuration example of the workpiece support member in one embodiment. FIG. 6(*a*) is a front view of the base member 410, and FIG. 6(*b*) is a front view of the supporting members 421 and 422. The supporting members 421 and 422 of the workpiece support member 400, which is the fourth configuration example, includes insertion holes 421*a*, 421*b*, 422*a*, and 422*b* at a lower part thereof, and the base member 410 includes hook portions 411, 412, 415, and 416 to be caught in the insertion holes 421*a*, 421*b*, 422*a* and 422*b*.

Hereinafter, the workpiece support member 400, which is the fourth configuration example, will be described in detail. As shown in FIGS. 5 and 6, the base member 410 includes, at the upper part thereof, the protruding hook portions 411 and 412 provided at corresponding positions of both ends of the supporting member 421 to be installed, and the hook portions 415 and 416 provided at corresponding positions of both ends of the supporting member 422. Further, the base member 410 includes supporting member attachment parts 413 and 414 provided between the hook portion 411 and the hook portion 412, and supporting member attachment parts 417 and 418 provided between the hook portion 415 and the hook portion 416. FIGS. 5 and 6(*a*) show a case in which there are two supporting member attachment parts provided between the hook portion 411 and the hook portion 412, and two supporting member attachment parts provided between the hook portion 415 and the hook portion 416. However, the number of the supporting member attachment parts is not limited to this, and may be one, or three or more.

The supporting member 421 is formed in a horizontally long shape including a long side of about ½ of the long side of the base member 410, and includes the insertion holes 421*a* and 421*b* at both ends of the lower part thereof as shown in FIG. 6(*b*). In the same manner, the supporting member 422 also includes the insertion holes 422*a* and 422*b* at both ends of the lower part thereof. Then, by utilizing the elasticity of the carbon fiber, the hook portions are inserted into the insertion holes at the both ends in a state in which the respective lower sides are caught in the supporting member attachment parts of the base member 410.

Specifically, by the operator for the attachment work, the hook portion 411 of the base member 410 is inserted into the insertion hole 421*a* at the left end of the lower side of the supporting member 421. Then, the central portion of the lower side is alternately caught in the front surface of the supporting member attachment part 413 and the rear surface of the supporting member attachment part 414. Further, the hook portion 412 is inserted into the insertion hole 421*b* at the right end of the lower side, so that the supporting member 421 is fitted into the base member 410.

Further, the hook portion 415 of the base member 410 is inserted into the insertion hole 422*a* at the left end of the lower side of the supporting member 422. Then, the central portion of the lower side is alternately caught in the rear surface of the supporting member attachment part 417 and the front surface of the supporting member attachment part 418. Further, the hook portion 416 is inserted into the insertion hole 422*b* at the right end of the lower side, so that the supporting member 422 is fitted into the base member 410.

When the supporting members 421 and 422 are fitted into the base member 410 in this manner, the hook portions 411, 412, 415, and 416 are caught in the insertion holes 421*a*, 421*b*, 422*a*, and 422*b*, respectively. Further, the supporting member attachment parts 413 and 414 are held by the lower side of the supporting member 421, and the supporting member attachment parts 417 and 418 are held by the lower side of the supporting member 422. As a result, the supporting members 421 and 422 are attached to the base member 410 in a stable state without being detached from the base member 410 even if the supporting members 421 and 422 are pulled upward.

A plurality of the workpiece support members 400 described above are arranged on the workpiece support table 3, and while the workpiece W to be processed is placed on the workpiece support table 3, the thermal processing is performed to the workpiece W. When any of the supporting members is damaged by the thermal processing, the operator detaches the hook portion of the corresponding supporting member of the corresponding workpiece support member 400 from the insertion hole and pulls the supporting member upward, so that the supporting member is removed. Then, while the new supporting member is being caught in the supporting member attachment part, the hook portion is inserted into the insertion hole at the corresponding location so as to be attached. In this manner, each of the supporting members 421 and 422 is configured to be easily attached to and removed from the base member 410.

By using the workpiece support member 400 as described above for the workpiece support table 3, it is possible to prevent the supporting members 421 and 422 from coming off from the base member 420 when the workpiece W is lifted even if the upper parts of the supporting members 421 and 422 of the workpiece support member 400 are sandwiched by the molten metal of the workpiece W during the thermal processing.

The present invention is not limited to the present embodiment described above, and various modifications can be made without departing from the summary of the present invention.

The disclosure of the present application is related to the subject matter described in Japanese Patent Application No. 2020-077114 filed on Apr. 24, 2020, all of the disclosure contents thereof are incorporated herein by reference.

The invention claimed is:

1. A workpiece support member for a thermal processing machine, the workpiece support member being installed on a workpiece support table to support a workpiece to be thermally processed, comprising:

a base member formed of a plate-like member in a horizontally long shape, and provided with a plurality of protruding supporting member attachment parts at predetermined distance intervals on an upper part thereof; and a supporting member formed of a plate-like member in a horizontally long shape, and installed in an attachable and removable state with a lower side thereof fitted alternately to a front surface and a rear surface of each of the adjacent supporting member attachment parts of the base member.

2. The workpiece support member for the thermal processing machine according to claim 1, wherein the supporting member is formed of a carbon fiber.

3. The workpiece support member for the thermal processing machine according to claim 1, wherein the supporting member is formed in a horizontally long shape including a long side shorter than a long side of the base member, and installed in multiple numbers on the base member.

4. The workpiece support member for the thermal processing machine according to claim 1, wherein the supporting member includes an insertion hole at a lower part thereof, and the base member includes a hook portion to be caught in the insertion hole.

* * * * *